UNITED STATES PATENT OFFICE.

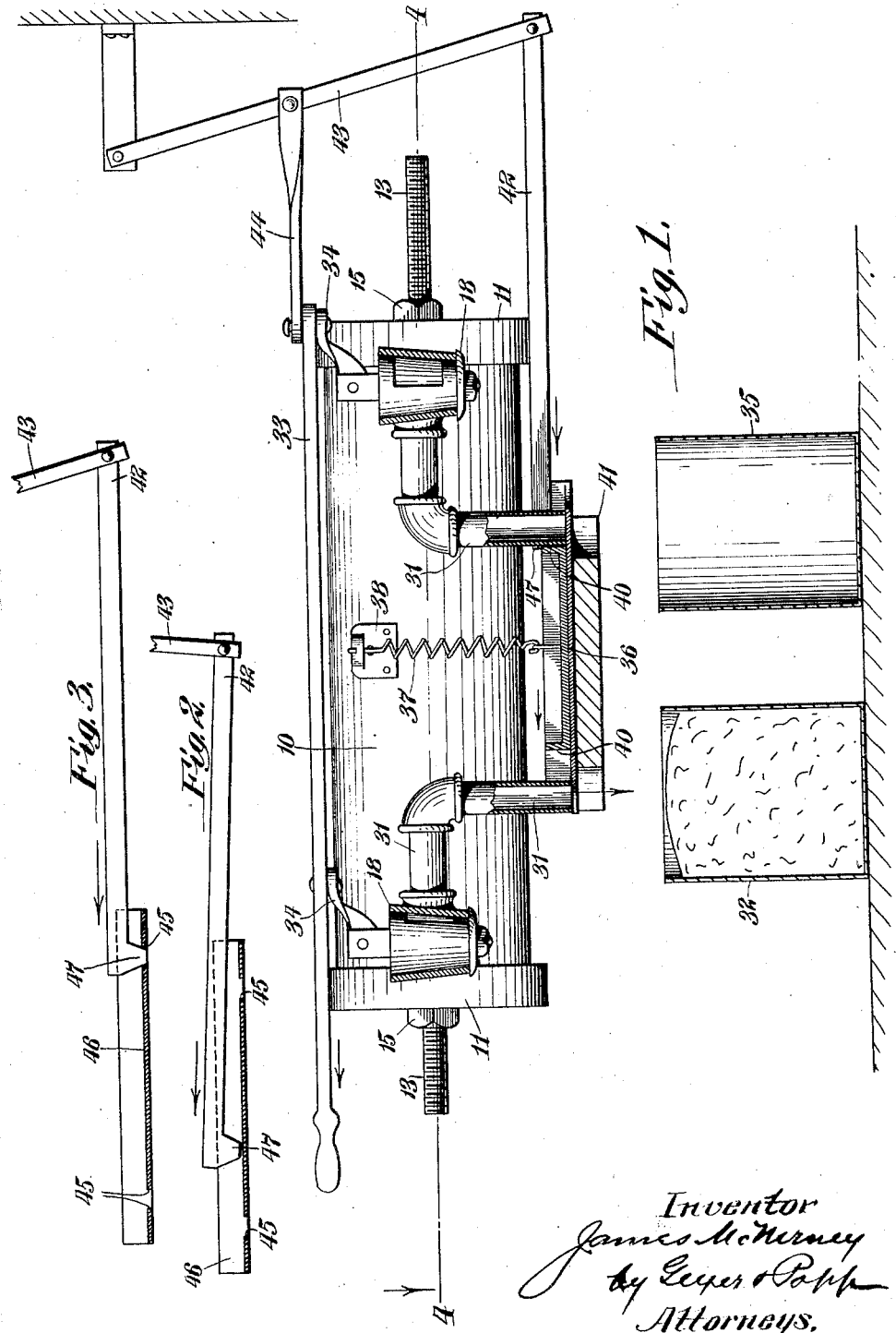

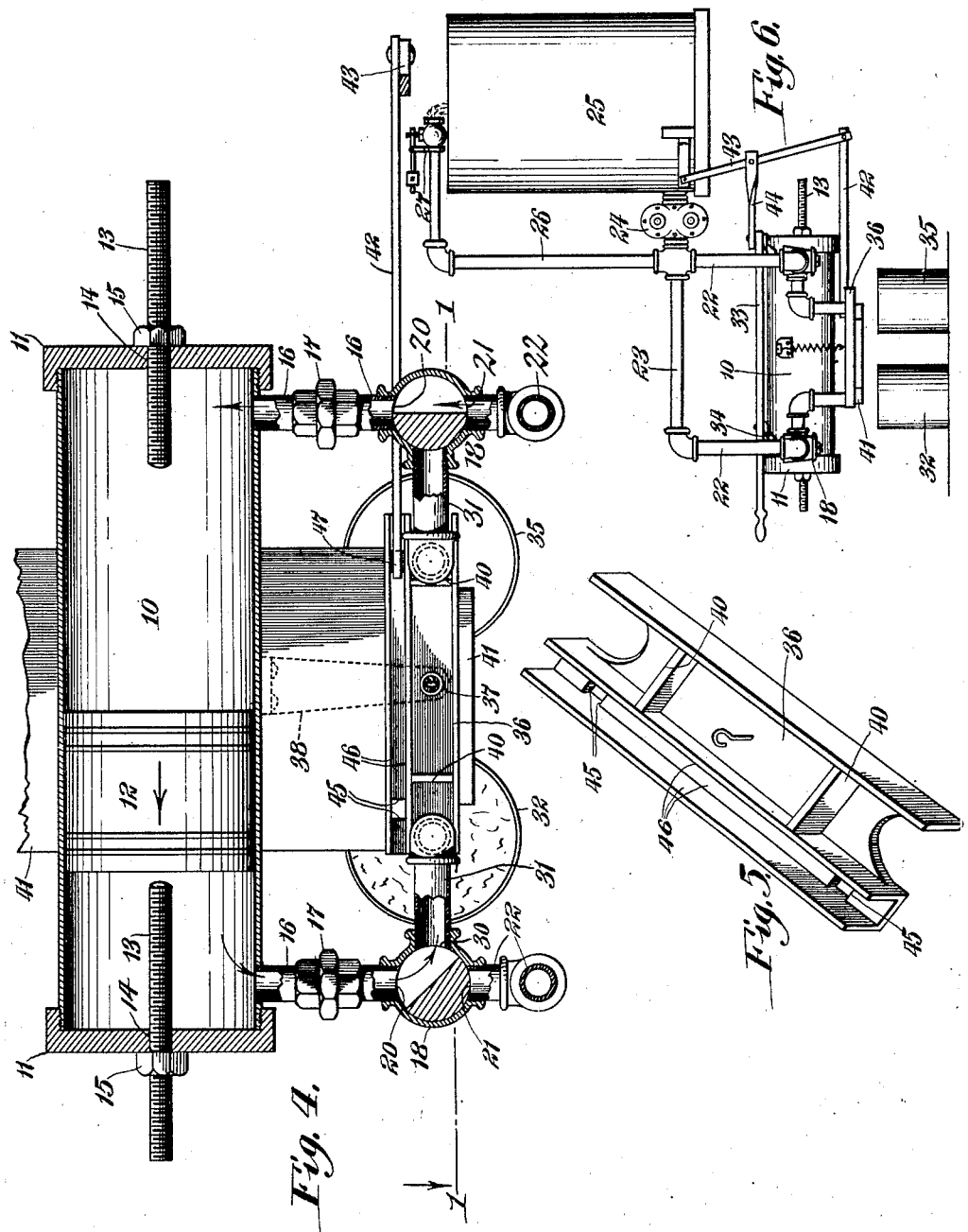

JAMES McNERNEY, OF BUFFALO, NEW YORK, ASSIGNOR, BY MESNE ASSIGNMENTS, TO SWAN & FINCH COMPANY, OF NEW YORK, N. Y., A CORPORATION OF NEW YORK.

MEASURING AND FILLING MACHINE.

1,381,926.
Specification of Letters Patent.
Patented June 21, 1921.

Application filed October 7, 1919. Serial No. 329,056.

*To all whom it may concern:*

Be it known that I, JAMES McNERNEY, a citizen of the United States, residing at Buffalo, in the county of Erie and State of New York, have invented new and useful Improvements in Measuring and Filling Machines, of which the following is a specification.

This invention relates to a machine for successively measuring a definite amount of heavy fluid and discharging the same into a suitable receptacle.

The machine is more particularly adapted to receive lubricating grease or leaf lard from a supply reservoir under pressure and deliver the same in a fixed but adjustable quantity into an ordinary tin pail or other suitable receptacle, such as is commonly used to facilitate the selling of the grease in the open market.

The object of the invention is to enable lubricating greases and similar heavy fluids to be very accurately measured and then the full measured quantity accurately and completely discharged irrespective of whether the grease is hard and stiff or whether the same be thin and watery and low in viscosity. A further object of the invention is to permit of adjusting this quantity so as to enable the one machine to fill receptacles of different capacities.

A still further object is to prevent the grease from dropping out of the outlet pipes after the flow of grease therein has ceased, thereby insuring that the discharges of grease are uniformly accurate in amount.

In the accompanying drawings:

Figure 1 is a vertical longitudinal section of the measuring and filling machine taken on line 1—1, Fig. 4. Figs. 2 and 3 are fragmentary details showing different positions of the lost motion dog and the restraining outlet valve. Fig. 4 is a horizontal longitudinal section through the machine taken on line 4—4, Fig. 1. Fig. 5 is a perspective view of the restraining outlet valve. Fig. 6 is a general plan of the whole machine together with the apparatus with which it is associated in use.

Similar characters of reference indicate corresponding parts throughout the several views.

10 represents a horizontal, longitudinally arranged cylinder having a smooth inner bore and provided at opposite ends with the heads or caps 11 which are screwed or otherwise secured to said cylinder. Slidably arranged in the bore of said cylinder is a piston 12 which is preferably of the trunk type *i. e.*, a piston which is very long compared to its diameter, and is preferably, though not necessarily, provided with a head or transverse wall at both ends. The longitudinal movement of said piston is adjustably limited at both ends of its stroke by means of the longitudinal adjustable limiting screws 13 which engage with internally threaded holes 14 in the heads 11 of the cylinder. Each limiting screw is held in its adjusted position by means of a lock nut 15 or otherwise, and either one or both of the limiting screws may be adjusted to alter the length of stroke of the piston. If desired, only one of the limiting screws may be employed at one end and a suitable stop arranged at the other, but the double screw arrangement shown in the drawings is preferred by reason of its greater latitude of adjustability.

Screwed into or otherwise connected to each end of the cylinder 10 are two communicating pipes 16. In the particular piping arrangement shown in the accompanying drawings, these communicating pipes extend laterally and horizontally out from their respective ends of the cylinder and union couplings 17 are employed to facilitate easy assembling. Tubularly connected to the outer end of each communicating pipe 16 is a three-way cock 18 which is provided with a communication port 20 which registers with the bore of said communicating pipe. Each three-way cock is also provided with an intake port 21 which registers with the bore of an inlet pipe 22.

The two inlet pipes 22 are preferably joined to a common feed pipe 23, as shown in Fig. 6. The lubricating grease or other heavy fluid which is fed into this feed pipe is preferably maintained at a constant pressure which pressure may be obtained in any suitable way. The arrangement shown in the drawings has been found to be commercially practicable and comprises a gear or other force pump 24 which draws the grease from a supply reservoir 25 and delivers the same under pressure to the common feed pipe 23 aforesaid. For the purpose of maintaining a fairly uniform pressure, an overflow pipe 26 is preferably provided which branches off of the feed pipe 23 and leads to the upper open end of the supply reservoir 25, terminating in an adjustable pressure regulating overflow valve 27, from whence the surplus grease is dropped back into said supply reservoir. When the operator of the machine ceases his filling operation, this overflow valve 27 acts in the capacity of a safety valve, all the grease then passing through the force pump 24 and overflow pipe 26 and out of said overflow valve 27. While the machine is being used however, the flow of grease out of said overflow valve 27 either ceases entirely or else becomes very small in amount, the valve in such cases merely serving to relieve any excess pressure, so that the grease in the common feed pipe 23 is maintained at substantially a uniform pressure. Similar results may be obtained by employing air pressure directly upon the surface of the grease in the supply reservoir or by any other suitable means. In fact the pressure obtained by the mere weight of the grease may be sufficient, as for instance, where the supply reservoir is situated a sufficient distance above the measuring and filling machine, or where the grease being handled is very thin and watery and thereby low in internal friction or viscosity.

Each of the three-way cocks is provided on the inner side of its bore with an outlet port 30 which registers with an outlet pipe 31. The outlet pipes extend horizontally inwardly toward each other a short distance and then bend vertically downwardly, parallel to each other. In the position of the three-way cocks shown in Fig. 4, the rear cock is causing a communication between the rear inlet pipe 22 and the rear end of the cylinder 10 but is completely closing off the rear outlet pipe 31. This allows the grease from the supply reservoir 25 to be forced under pressure against the rear face of the piston 12, tending to move the same forwardly. The forward end of the cylinder has been filled by a previous cycle of operations of the machine, and the forward movement of the piston causes this confined grease to pass through the front three-way cock into the front outlet pipe 31, from whence it falls into the receptacle 32 which is to be filled. As soon as the piston has completed its forward movement and has come into contact with the front adjusting screw 13, the flow of grease from the front outlet pipe 31 will cease. When this has occurred, the operator pulls a control rod 33 which is pivoted to the respective arms 34 of the three-way cocks 18. This action causes a simultaneous movement of both of the three-way cocks, so that their relative positions are reversed, each cock moving in a counterclockwise direction from the position shown in Fig. 4. This new position of the three-way cocks will allow the grease from the reservoir to now flow into the forward end of the cylinder, thereby forcing the piston rearwardly and forcing the grease which is confined in the rear end of the cylinder out through the rear outlet pipe 31 into another waiting receptacle 35. Then when the flow of grease has ceased, the operator pushes the operating rod 33 rearwardly back into the position shown in the drawings, and the cycle is repeated. It will be noted that the amount of discharge depends on the length of stroke of the piston 12, so that the quantity discharged can be regulated within a wide latitude by suitably adjusting either one or both of the adjusting screws 13 either inwardly or outwardly.

The machine as so far described has been found to be commercially practicable for measuring the heavier kinds of lubricating grease and discharging the full measured quantity uniformly and consistently. It has been found however when a thinner and less viscous fluid, such as transmission grease, is being handled, that the grease may or may not stick to and completely fill the bore of the outlet pipes 31. To insure the uniform operation of the machine, a restraining outlet valve 36 is employed which acts to hold the thinner grease up in the particular outlet pipe which is not discharging any grease at that particular time. This restraining valve is arranged to slide horizontally and cover the extreme lower end of either one or the other of the outlet pipes 31. The valve is preferably yieldingly forced upwardly against the lower ends of said pipes by means of a tension spring 37, whose lower end is attached to said valve and whose upper end is secured to a bracket 38 which is mounted on the cylinder 10, or is otherwise suitably secured. The longitudinal movement of the valve is limited by the front and rear stops 40 with which the valve is provided and which are adapted to strike against the inner faces of the front or rear outlet pipes respectively. If desired, the valve may also be supported by a bed plate or table rest 41 which may be secured to the frame of the machine in any desired manner. The operation of the restraining outlet valve is effected by means of a lost motion dog 42 whose rear end is pivoted to an actuating lever 43. This lever is suitably pivoted at its upper end to the frame of the machine and is intermediately loosely pivoted to a twisted link 44. Thus, when the operator moves the operating rod 33 forwardly or backwardly, the lost motion dog 42 is likewise moved in the same direction. It is desirable to close the restraining outlet valve 36 very quickly to prevent the escape of grease from the outlet pipes 31 and for this reason the lost motion dog 42 is so arranged as to effect a closing of the said restraining valve 36 upon the first part of its movement and thereafter to travel idly. This action is accomplished by forming two detaining notches 45 in the restraining valve, longitudinally in line with each other and preferably formed in the bottom surface of a guide channel or groove 46 of said restraining valve 36. The forward lower end of the lost motion dog 42 is provided with a detent finger 47, as best shown in Figs. 2 and 3. In the rearmost position shown in Fig. 3, this detent finger is in engagement with the rear detaining notch 45, and a forward movement of the lost motion dog 42 imparts a like motion to the restraining valve. This forward valve motion continues until the front stop 40 strikes the rear side of the front outlet pipe 31 causing the whole restraining valve to also stop. The forward movement of the lost motion dog then continues idly until the detent finder 47 thereof drops into the front detaining notch 45, so that when the whole operation is reversed, the lost motion dog acts to move said restraining valve in the opposite or rearward direction until the rear stop 40 comes into contact with the front face of the rear outlet pipe 31. Inasmuch as a movement of said restraining valve operates to simultaneously open one of the outlet pipes and close the other and the motion in either direction is very rapid, it follows that the grease is prevented from dropping out of the outlet pipes after the piston has reached the end of its stroke. The restraining valve is intended to completely cut off the egress of grease, the three-way cocks operating primarily to direct the path of the flow of the grease. For this reason, it is preferred that the linkage of the operating parts be such that at all times the area of the orifice at each end of the restraining valve be somewhat less than the orifice of its respective three-way valve and accordingly it is preferred that the restraining valve effect a complete closure of the other outlet pipe before the passage thereto through the companion three-way valve is completely closed. In other words, it is desired that the restraining valve close ahead of the three-way cocks.

It will be thus apparent that this improved measuring and filling machine accurately measures any sort of heavy viscous fluid such as lubricating grease, butter, lard, cosmetics, wet porcelain clay, cement, tar, etc., and that the measured quantity is completely and uniformly exuded therefrom. Furthermore, the quantity to be measured is adjustably variable within wide limits. The machine being provided with two outlet or discharge pipes, the rapidity of the filling operation is greatly facilitated by permitting an empty receptacle to be placed in position while the other receptacle is being filled. The machine is thus very rapid in operation as well as accurate, and is capable of handling fluids of differing viscosity, thereby meeting a real need in the commercial field.

I claim as my invention:

1. A measuring and filling machine comprising a three-way cock, an outlet pipe connected therewith, and a restraining outlet valve which closes synchronously with said three-way cock but which offers a greater resistance to the flow of the fluid therethrough.

2. A measuring and filling machine comprising a three-way cock, an outlet pipe connected therewith, and a restraining outlet valve which is located at the extreme outer end of said outlet pipe and is adapted to close in unison with the closure of said three-way cock but is arranged to be completely closed before said three-way cock closes.

3. A measuring and filling machine comprising a cylinder, a piston, a pair of three-way cocks connected separately to opposite ends of said cylinder and connected mutually to a supply reservoir, an outlet pipe connected to each of said cocks, and a restraining outlet valve arranged to operate synchronously with said three-way cocks.

4. A measuring and filling machine comprising a restraining outlet valve provided with a detaining notch, an actuating lever, a lost motion dog connected with said lever and adapted to engage with said detaining notch during only a portion of its stroke.

5. A measuring and filling machine comprising a cylinder, a piston, outlet pipes tubularly connected to opposite ends of said cylinder, a restraining outlet valve arranged at the extreme outer ends of said outlet pipes and provided with a pair of detaining notches, a lost motion dog arranged to engage with one of said notches during a portion of its stroke and then to idly move into engagement with the other detaining notch.

6. A measuring and filling machine comprising a cylinder, a piston, a pair of three-way cocks connected separately to opposite ends of the cylinder and both connected to a common supply reservoir, an outlet pipe connected to each of said cocks, a restraining outlet valve arranged at the outer ends of said outlet pipes, an actuating lever operatively connected with both of said cocks, and a lost motion connection between said valve and said lever.

7. A measuring and filling machine comprising a cylinder, a piston slidable therein, a pair of three-way cocks connected to a supply reservoir and separately connected to opposite ends of said cylinder, an outlet pipe connected to each of said cocks, a restraining outlet valve arranged at the outer ends of said outlet pipes and provided with a pair of detaining notches, an actuating lever operatively connected to both of said cocks, a lost motion dog connected to said lever and adapted to engage alternately with said detaining notches and to have an alternate lost motion movement between said engagements with said detaining notches.

8. A measuring and filling machine comprising a cylinder, a piston, three-way cocks connected to opposite ends of said cylinder, an outlet pipe connected to each cock, a restraining outlet valve arranged at the outer ends of said outlet pipes and provided with a pair of detaining notches and a pair of stops, a lost motion dog operatively connected to both of said cocks and arranged to alternately engage with one or the other of said notches so as to move said restraining valve to the limit of motion provided by the stops thereof and thereafter to idly move into engagement with the other detaining notch.

9. A measuring and filling machine comprising a cylinder, a piston, adjustable limiting screws arranged in the heads of said cylinder, three-way cocks connected to a common supply reservoir and individually to the opposite ends of the cylinder, an outlet pipe connected to each of said cocks, a restraining outlet valve arranged at the outer ends of said outlet pipes and provided with stops and detaining notches, an actuating lever operatively connected to said three-way cocks, a lost motion dog connected to said lever and arranged to alternately engage with first one and then the other of said detaining notches.

JAMES McNERNEY.